United States Patent
Zhang et al.

(10) Patent No.: US 12,132,184 B2
(45) Date of Patent: Oct. 29, 2024

(54) LIQUID COOLING PLUG-IN ASSEMBLY, LIQUID COOLING PLUG-IN DEVICE, AND BATTERY PACK ASSEMBLY

(71) Applicant: AULTON NEW ENERGY AUTOMOTIVE TECHNOLOGY GROUP, Shanghai (CN)

(72) Inventors: Jianping Zhang, Shanghai (CN); Chunhua Huang, Shanghai (CN)

(73) Assignee: AULTON NEW ENERGY AUTOMOTIVE TECHNOLOGY GROUP, Shanghai (CN)

( * ) Notice: Subject to any disclaimer, the term of this patent is extended or adjusted under 35 U.S.C. 154(b) by 613 days.

(21) Appl. No.: 17/419,611

(22) PCT Filed: Dec. 30, 2019

(86) PCT No.: PCT/CN2019/130096
§ 371 (c)(1),
(2) Date: Jun. 29, 2021

(87) PCT Pub. No.: WO2020/135883
PCT Pub. Date: Jul. 2, 2020

(65) Prior Publication Data
US 2022/0021052 A1     Jan. 20, 2022

(30) Foreign Application Priority Data
Dec. 29, 2018 (CN) .......................... 201811645940.0

(51) Int. Cl.
*H01M 10/6567* (2014.01)
*H01M 10/613* (2014.01)
(Continued)

(52) U.S. Cl.
CPC ..... *H01M 10/6567* (2015.04); *H01M 10/613* (2015.04); *H01M 10/625* (2015.04);
(Continued)

(58) Field of Classification Search
CPC ............ H01M 10/613; H01M 10/625; H01M 10/6567; H01R 13/6315
See application file for complete search history.

(56) References Cited

U.S. PATENT DOCUMENTS

| 2006/0240695 | A1* | 10/2006 | Mattern ............. | H01R 13/6315 |
| | | | | 439/247 |
| 2016/0010772 | A1* | 1/2016 | Tiberghien ................ | F28F 3/12 |
| | | | | 285/24 |

FOREIGN PATENT DOCUMENTS

| CN | 1761585 | * | 4/2006 |
| CN | 105263293 | | 1/2016 |

(Continued)

OTHER PUBLICATIONS

English translation of DE Publication 10-2015-208965, Nov. 2016.*
(Continued)

*Primary Examiner* — Brittany L Raymond
(74) *Attorney, Agent, or Firm* — Hodgson Russ LLP

(57) ABSTRACT

A liquid cooling plug-in assembly, a liquid cooling plug-in device, and a battery pack assembly are provided. The liquid cooling plug-in assembly includes a first fixed plate, a floating plate, at least one first elastic member, and a plurality of plug-in members, the plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member.

19 Claims, 7 Drawing Sheets

(51) Int. Cl.
  *H01M 10/625*  (2014.01)
  *H01M 50/204*  (2021.01)
  *H01M 50/271*  (2021.01)
  *H01R 13/631*  (2006.01)

(52) U.S. Cl.
  CPC ....... *H01M 50/204* (2021.01); *H01M 50/271* (2021.01); *H01R 13/6315* (2013.01)

(56) References Cited

FOREIGN PATENT DOCUMENTS

| CN | 106299782 | 1/2017 | |
|---|---|---|---|
| CN | 206282945 | 6/2017 | |
| CN | 206432475 | 8/2017 | |
| CN | 206441961 | 8/2017 | |
| CN | 107732082 | 2/2018 | |
| CN | 207034449 | 2/2018 | |
| DE | 10-2015-208965 | * 11/2016 | |
| JP | 2015020685 | 2/2015 | |

OTHER PUBLICATIONS

WIPO, International Search Report for PCT/CN2019/130096, Mar. 27, 2020.
JPO, Office Action for JP Application No. 2021-537993, Sep. 13, 2022.
IPI, Office Action for IN Application No. 202127033712, May 4, 2022.
EPO, Extended European Search Report for EP Application No. 19906161.5, Jul. 8, 2022.
CNIPA, First Office Action for CN Application No. 201811645940.0, Jul. 17, 2024.
JPO, Office Action for JP Application No. 2023-098433, Jul. 2, 2024.

* cited by examiner

LIQUID COOLING PLUG-IN ASSEMBLY, LIQUID COOLING PLUG-IN DEVICE, AND BATTERY PACK ASSEMBLY

CROSS-REFERENCE TO RELATED APPLICATIONS

The present application is a U.S. National Phase application under 35 U.S.C. § 371 of International Patent Application No. PCT/CN2019/130096, filed on Dec. 30, 2019, which claims priority to Chinese Patent Application No. 201811645940.0, filed on Dec. 29, 2018. The entire disclosures of the above-mentioned patent applications are incorporated by reference herein.

FIELD

The present invention relates to a liquid cooling plug-in assembly, a liquid cooling plug-in device, and a battery pack assembly.

BACKGROUND

At present, an electric vehicle adopts hydraulic pressure to cool a battery pack, which increases the heat exchange capacity in the battery pack; the temperature of a battery cell in the battery pack is transferred to and processed by a cool-heat exchange module outside the battery pack through liquid flow, to balance a battery temperature, improve the full capacity of the battery, and directly improve performance indicators such as limited use environment, power performance, and battery life of the vehicle. However, after the liquid cooling plug-in members on the battery pack are connected, floating occurs usually due to vehicle body vibration and other reasons and the liquid cooling plug-in member has insufficient load, causing the outflow and splashing of a liquid.

SUMMARY

A technical problem to be solved by the present invention is to provide a liquid cooling plug-in assembly, a liquid cooling plug-in device and a battery pack assembly, to overcome such defects of an existing liquid cooling plug-in member as the outflow and splashing of a liquid, caused by the insufficient float.

The present invention solves the above technical problem through the following technical solutions.

Provided is a liquid cooling plug-in assembly, including a first fixed plate, a floating plate, at least one first elastic member, and a plurality of plug-in members, wherein the plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member.

In this solution, with the above-mentioned structural form, the plurality of plug-in members are in floating connection with the first fixed plate by means of the first elastic member, so that the plug-in member has a large float, thus greatly enhancing the stability of the connection and effectively avoiding the outflow and splashing of a liquid in the plug-in member.

Preferably, a length direction of the first elastic member is the same as an insertion direction of the plug-in member, and two ends of the first elastic member abut against the first fixed plate and the floating plate, respectively.

Preferably, the first elastic member is configured as a belleville spring.

Preferably, the liquid cooling plug-in assembly further includes a plurality of second elastic members; the plurality of second elastic members are all located in the movement cavity, two ends of the second elastic member are respectively connected to the first fixed plate and the floating plate, and the plurality of second elastic members are distributed around an outer peripheral edge of the floating plate.

In this solution, with the above-mentioned structural form and by virtue of the plurality of second elastic members, the floating connection of the floating plate and adjustment of a position state are realized, and a large float is achieved, thereby effectively avoiding the outflow and splashing of a liquid in the plurality of plug-in members connected to the floating plate and greatly improving the stability of the liquid cooling plug-in assembly.

In addition, the plurality of second elastic members act on the periphery of the floating plate, which effectively prevents the floating plate from shifting, displacement and shaking during a moving process.

Preferably, the insertion directions of the plurality of plug-in members are all perpendicular to a length direction of the second elastic member.

In this solution, with the above-mentioned structural form and by virtue of the second elastic members, the plurality of plug-in members move along a plate plane direction of the floating plate to conduct position adjustment, thereby effectively avoiding the outflow and splashing of the liquid in the plug-in member and improving the stability of the liquid cooling plug-in assembly.

Preferably, the second elastic member is configured as a tension spring.

Preferably, the first fixed plate includes a fixed frame, a front cover plate and a rear cover plate, the front cover plate and the rear cover plate are respectively connected to two sides of the fixed frame, the movement cavity is defined by the front cover plate, the fixed frame and the rear cover plate, and the first elastic member is pressed between the floating plate and the rear cover plate.

In this solution, with the above-mentioned structural form, the structure is simplified and the liquid cooling plug-in assembly can be produced more conveniently.

Preferably, the liquid cooling plug-in assembly further includes a sealing member; the front cover plate is provided with a first connection opening, the first connection opening is in communication with the movement cavity, the floating plate is located in the first connection opening and the movement cavity, the first sealing member is connected to the front cover plate, and the first sealing member continuously and incessantly surrounds the first connection opening.

In this solution, with the above-mentioned structural form, the first sealing member is mounted on the front cover plate to perform a sealing function, which effectively prevents dust and other small particles from entering the movement cavity through the first connection opening in the actual use of the liquid cooling plug-in assembly, thus ensuring the reliability of the liquid cooling plug-in assembly.

Preferably, the rear cover is provided with a second connection opening, the second connection opening is in communication with the movement cavity, the floating plate passes through the second connection opening and is connected to the plug-in member, the liquid cooling plug-in assembly further includes a second sealing member, the second sealing member continuously and incessantly surrounds the second connection opening, and the second sealing member is connected to the rear cover plate and pressed between the rear cover plate and the floating plate.

In this solution, with the above-mentioned structural form, the second sealing member is mounted on the rear cover plate to perform a sealing function, which effectively prevents dust and other small particles from entering the movement cavity through the second connection opening in the actual use of the liquid cooling plug-in assembly, thus ensuring the reliability of the liquid cooling plug-in assembly.

Preferably, the floating plate is provided with at least one mounting hole on a side facing the front cover plate, the liquid cooling plug-in assembly further includes at least one positioning pin, one end of the positioning pin is connected to the mounting hole, and the other end of the positioning pin extends outward along an insertion direction of the plug-in member.

In this solution, with the above-mentioned structural form, the positioning pin has a guiding and positioning function to realize accurate insertion of the floating plate.

Preferably, the mounting hole penetrates the floating plate, and the first elastic member is inserted into the mounting hole and abuts against the positioning pin.

In this solution, with the above-mentioned structural form, the mounting hole will limit the first elastic member, thereby effectively avoiding the offset and displacement of the first elastic member during use, improving the stability of the liquid cooling plug-in assembly, and realizing convenient installation.

Preferably, the floating plate is provided with a plurality of first liquid through holes, the plurality of first liquid through holes are in one-to-one correspondence with the plurality of plug-in members, the plug-in member is in threaded connection to one end of the first liquid through hole, and the other end of the first liquid through hole is configured to communicate with an external liquid supply system.

In this solution, with the above-mentioned structural form, the first liquid through hole in the floating plate is in communication with the plug-in member, which facilitates the assembly and ensures convenient use.

Further provided is a liquid cooling plug-in device, including a matching plug-in assembly and a liquid cooling plug-in assembly, and the matching plug-in assembly is detachably connected to the liquid cooling plug-in assembly. The liquid cooling plug-in assembly includes a first fixed plate, a floating plate, at least one first elastic member, and a plurality of plug-in members. The plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member.

In this solution, with the above-mentioned structural form and by virtue of the first elastic member, the plug-in member has a large float, thus greatly enhancing the stability of the connection, effectively avoiding the outflow and splashing of the liquid in the plug-in member, realizing no leakage during the use of the liquid cooling plug-in device, and prolonging the service life of the liquid cooling plug-in device.

Preferably, the matching plug-in assembly includes a second fixed plate and a plurality of matching members, the plurality of matching members are all connected to the second fixed plate and in one-to-one correspondence with the plurality of plug-in members, and the matching member is detachably connected to the liquid cooling plug-in assembly and in communication with the plug-in member.

Preferably, the second fixed plate includes a plurality of second liquid through holes, and the plurality of second liquid through holes are in one-to-one correspondence with the matching members, the matching member includes an insert and a pipe joint, the insert is in threaded connection to one end of the second liquid through hole, the pipe joint is in threaded connection to the other end of the second liquid through hole, the insert is inserted into the floating plate or the plug-in member, and the plug-in member, the insert and the pipe joint are in mutual communication.

In this solution, with the above-mentioned structural form, the assembly of the matching plug-in assembly is facilitated and convenient use is ensured.

Preferably, the liquid cooling plug-in assembly further includes a first sealing member connected to the first fixed plate, the second fixed plate is provided with a protruding ring on a side facing the first fixed plate, the protruding ring and the first sealing member both continuously and incessantly surround the plurality of matching members, and the protruding ring abuts against the first sealing member.

In this solution, with the above-mentioned structural form, the protruding ring closely abuts against the first sealing member and the sealing effect is further enhanced, thereby preventing dust and other small particles from entering the movement cavity, and improving the reliability of the liquid cooling plug-in device.

Preferably, the liquid cooling plug-in assembly further includes at least one positioning pin, the positioning pin is connected to the floating plate and extends outward in a direction of the matching plug-in assembly, the matching plug-in assembly further includes at least one positioning sleeve, the positioning sleeve is connected to the second fixed plate, the positioning pins are in one-to-one correspondence with the positioning sleeves, and the positioning pin is inserted in the positioning sleeve.

In this solution, with the above-mentioned structural form, the positioning sleeve and the positioning pin can play a guiding and positioning role, which improves the plug-in accuracy of the liquid cooling plug-in assembly and the matching plug-in assembly and improves the stability of the liquid cooling plug-in device.

Preferably, the matching member is configured as a liquid cooling socket, and the plug-in member is configured as a liquid cooling plug; or, the matching member is configured as a liquid cooling plug, and the plug-in member is configured as a liquid cooling socket; and the liquid cooling plug is matched with the liquid cooling socket.

Further provided is a battery pack assembly, including a liquid cooling plug-in device. The liquid cooling plug-in device includes a matching plug-in assembly and a liquid cooling plug-in assembly, and the matching plug-in assembly is detachably connected to the liquid cooling plug-in assembly. The liquid cooling plug-in assembly includes a first fixed plate, a floating plate, at least one first elastic member, and a plurality of plug-in members. The plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member.

In this solution, with the above-mentioned structural form, the temperature control of the battery pack is realized and the performance indicators of the battery pack are improved. Moreover, the outflow and splashing of the liquid are effectively avoided, and the stability of the battery pack assembly is greatly improved.

On the basis of conforming to common knowledge in the art, the above-mentioned preferred conditions can be combined arbitrarily to obtain preferred embodiments of the present invention.

The positive and progressive effects of the present invention are as follows.

In the liquid cooling assembly, the liquid cooling device and the battery pack assembly of the present invention, the floating plate is in floating connection with the first fixed plate by means of the first elastic member, so that the plug-in member has a large float, thus greatly enhancing the stability of the connection and effectively avoiding the outflow and splashing of the liquid in the plug-in member.

DETAILED DESCRIPTION

The following further illustrates the present invention more clearly and completely by way of embodiments in conjunction with the drawings, but the present invention is not limited to the scope of the embodiments.

Figure 1:
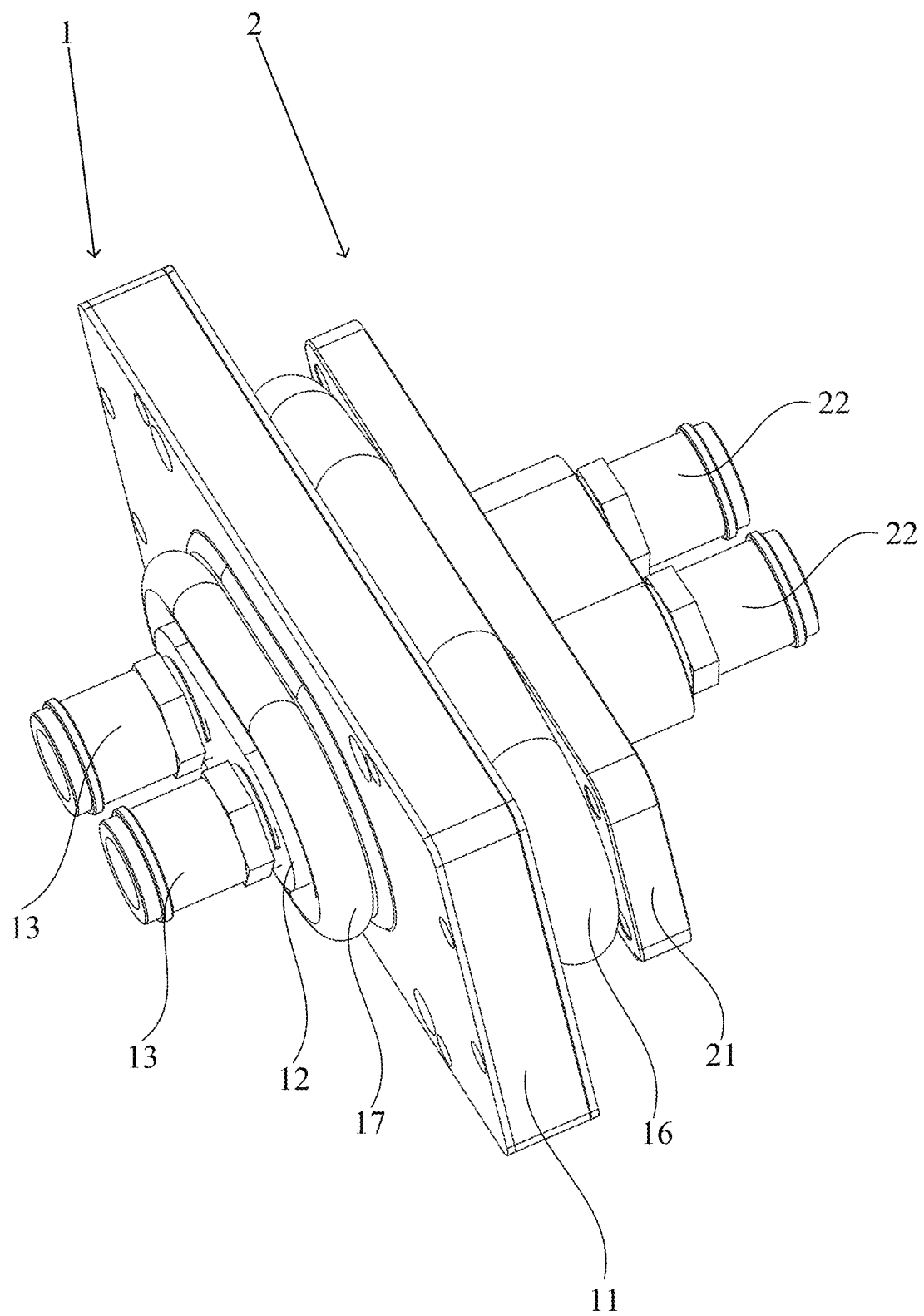
FIG. 1 is a schematic structural diagram of a liquid cooling plug-in device according to a preferred embodiment of the present invention.
Figure 2:
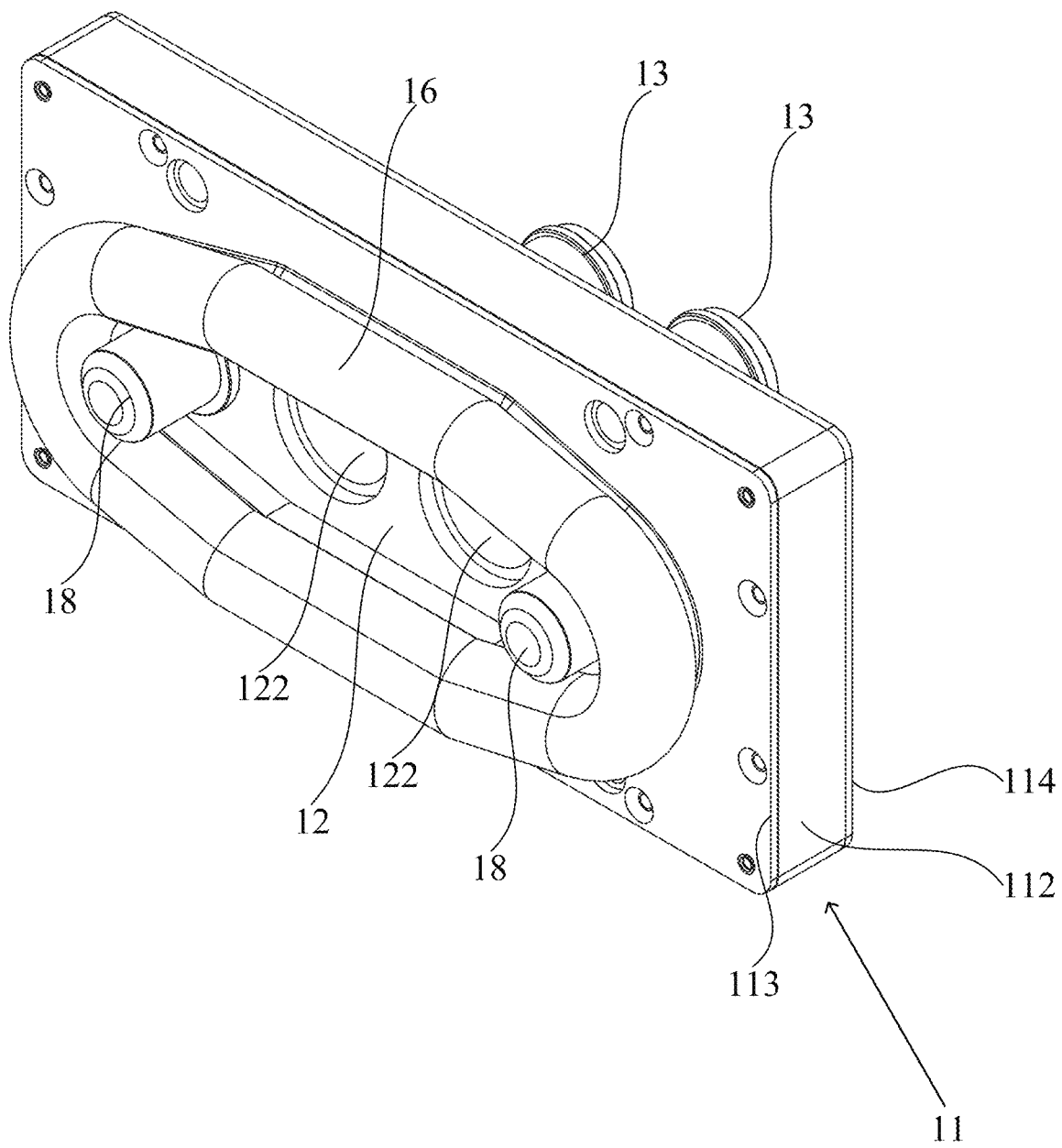
FIG. 2 is a schematic structural diagram of a liquid cooling plug-in assembly in a liquid cooling plug-in device according to an embodiment of the present invention.
Figure 3:
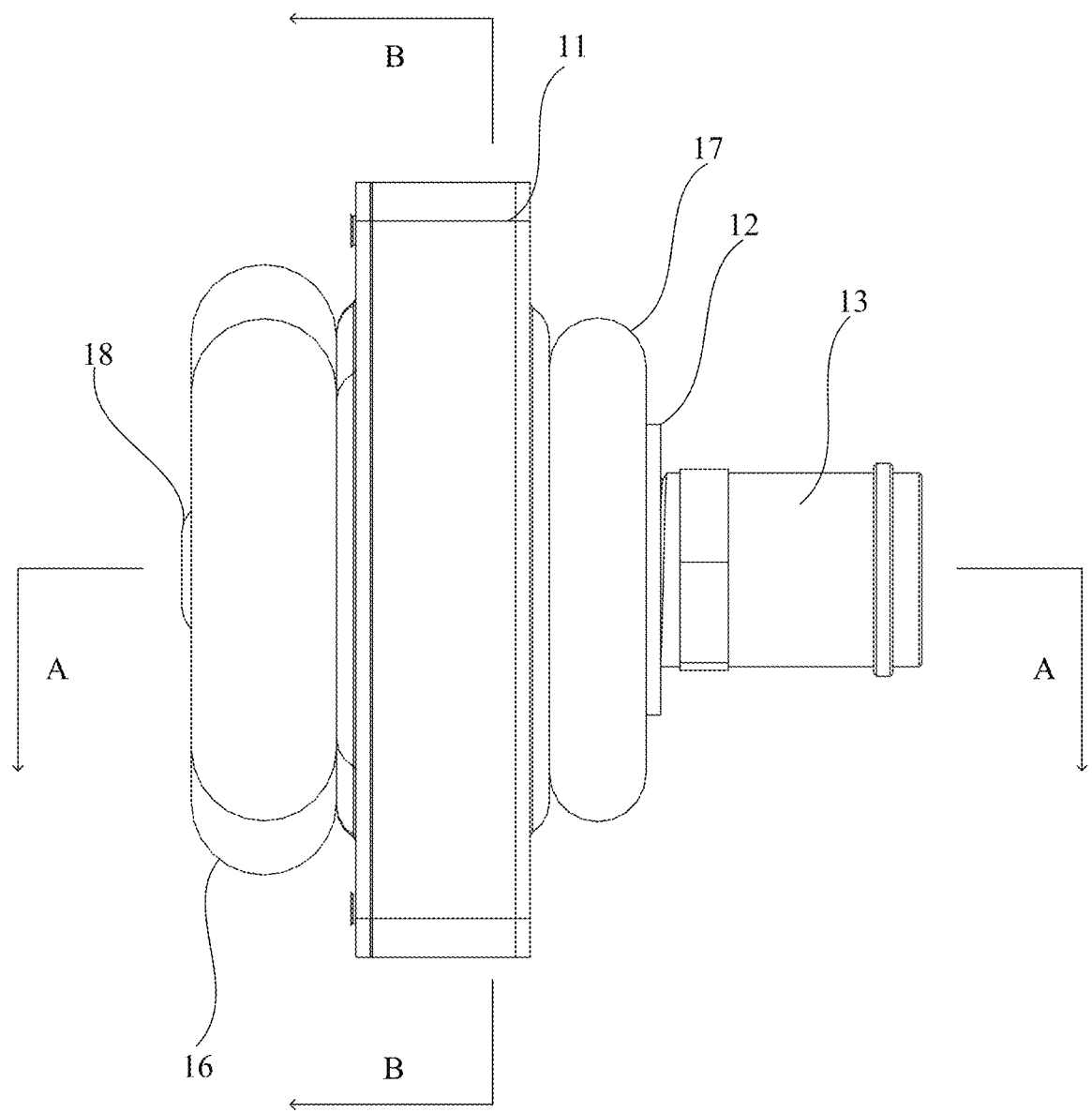
FIG. 3 is another schematic structural diagram of a liquid cooling plug-in assembly in a liquid cooling plug-in device according to an embodiment of the present invention.
Figure 4:
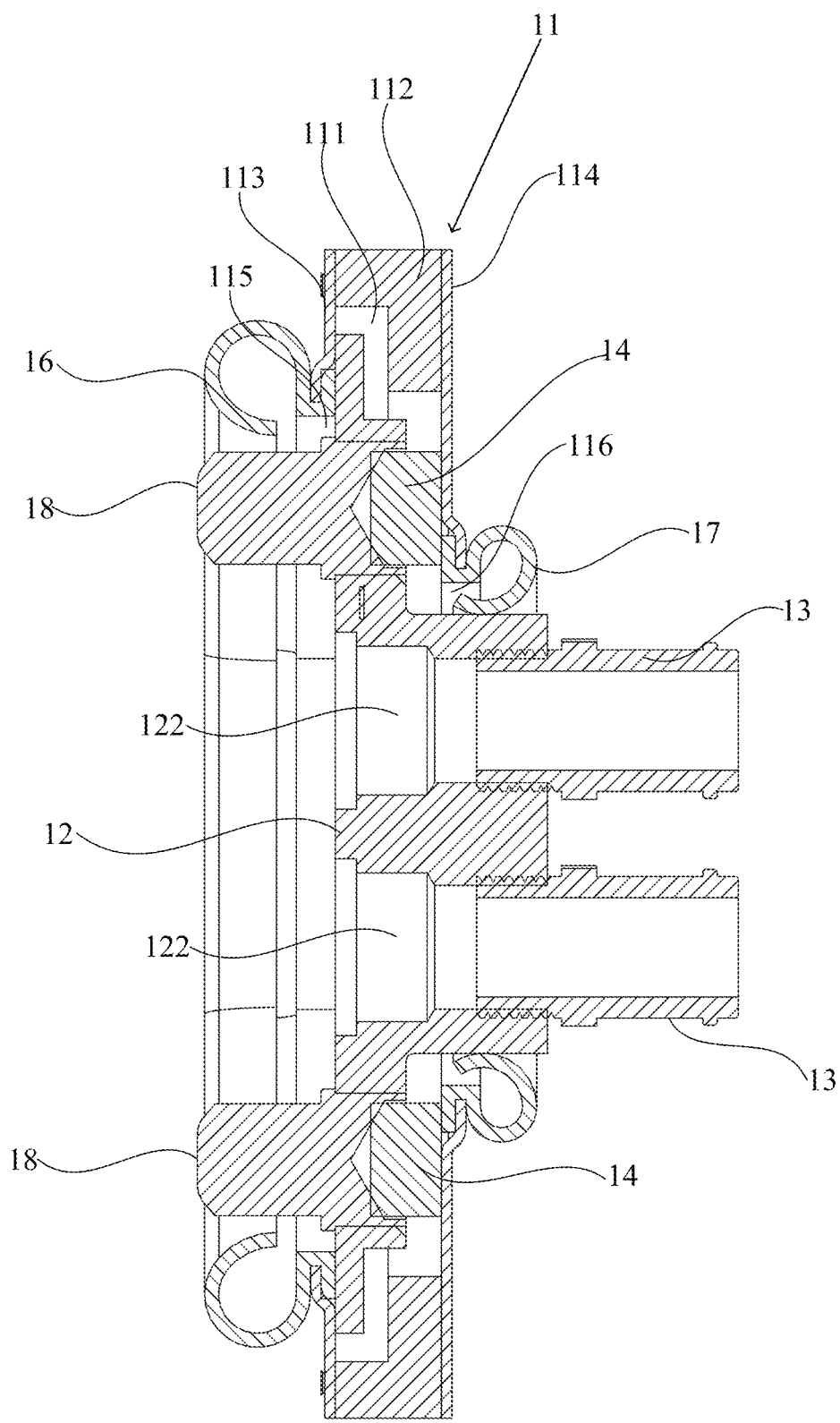
FIG. 4 is a schematic cross-sectional view of FIG. 3 along the A-A direction.
Figure 5:
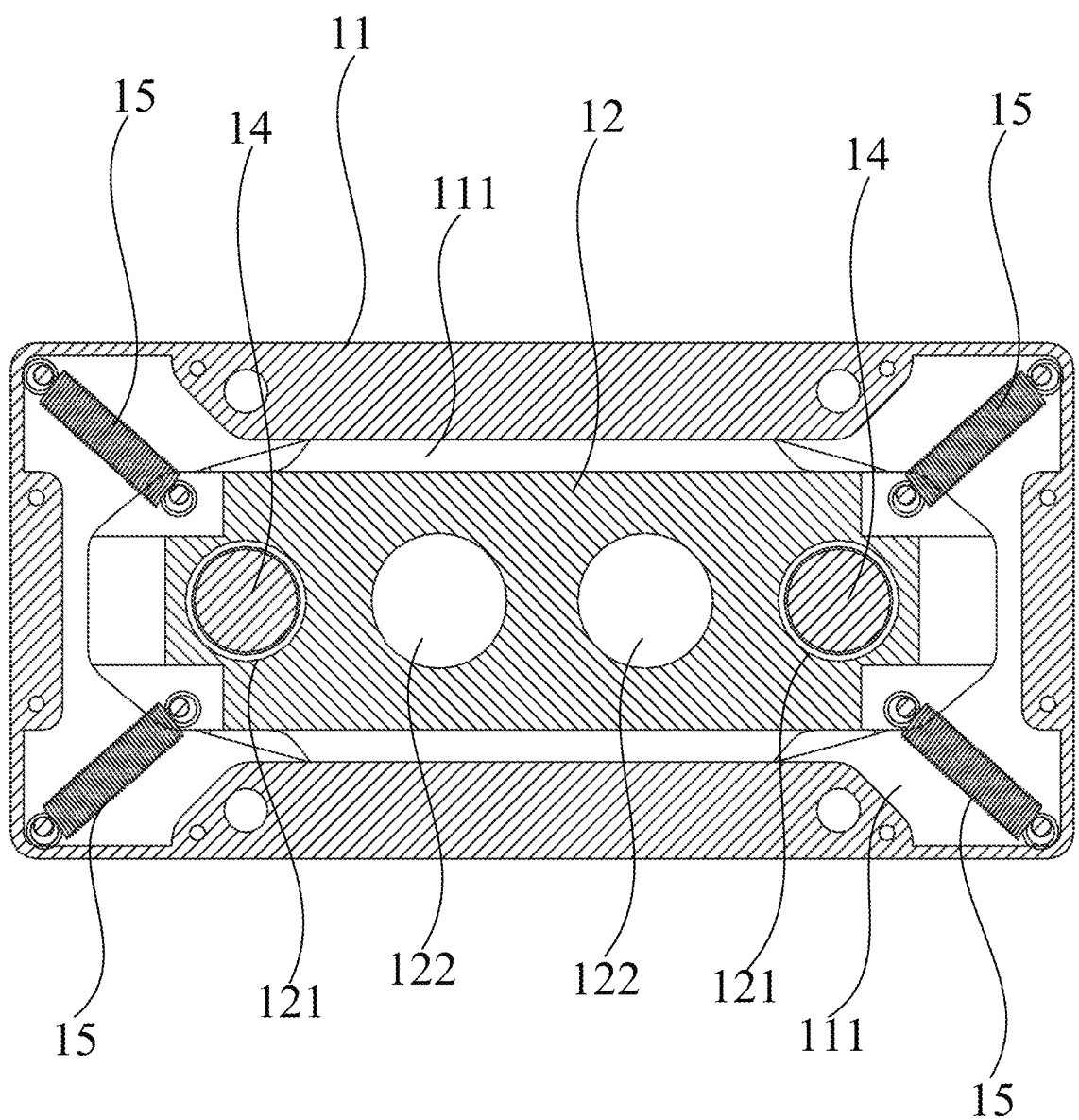
FIG. 5 is a schematic cross-sectional view of FIG. 3 along the B-B direction.
Figure 6:
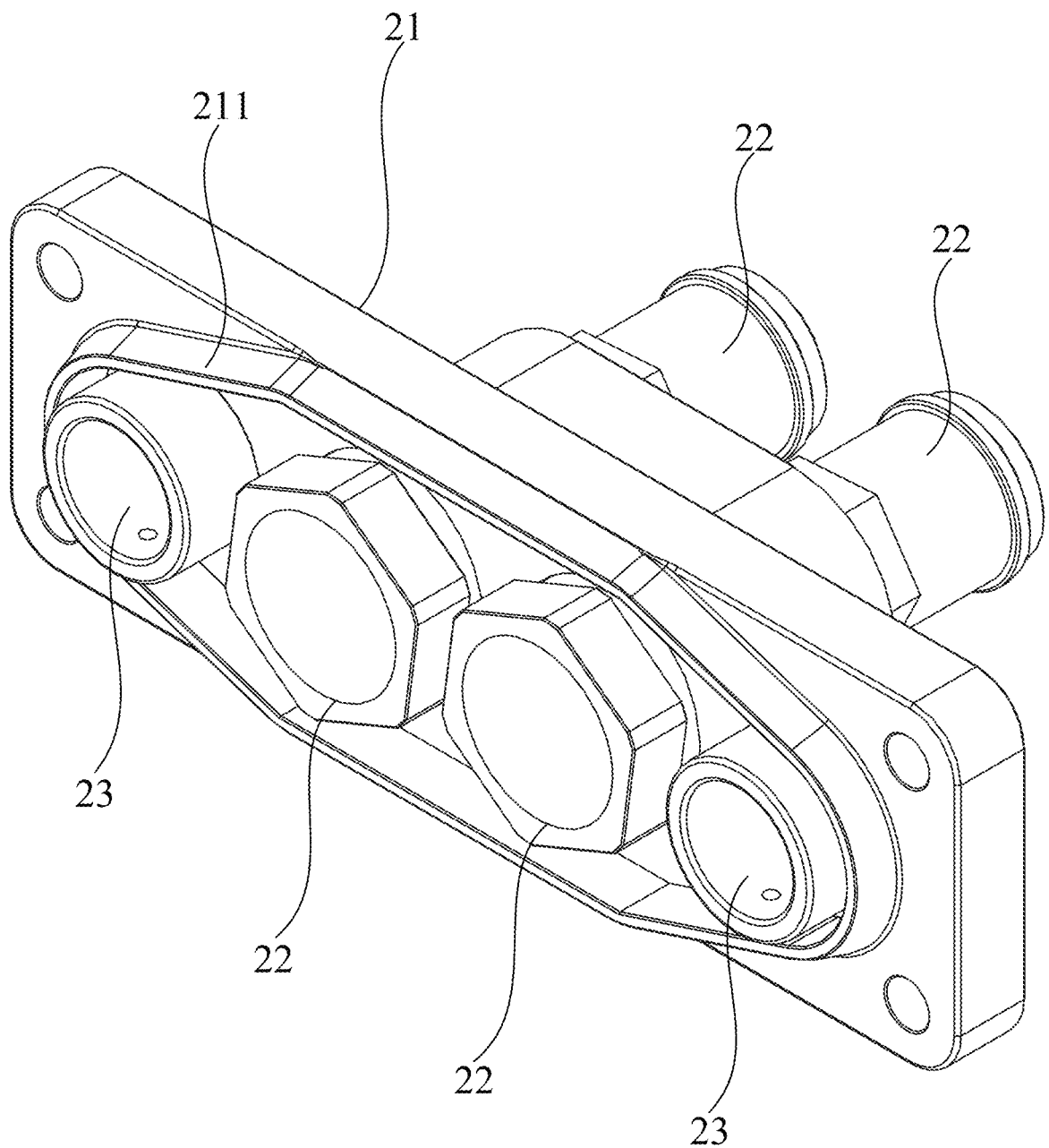
FIG. 6 is a schematic structural diagram of a matching plug-in assembly in a liquid cooling plug-in device according to an embodiment of the present invention.
Figure 7:
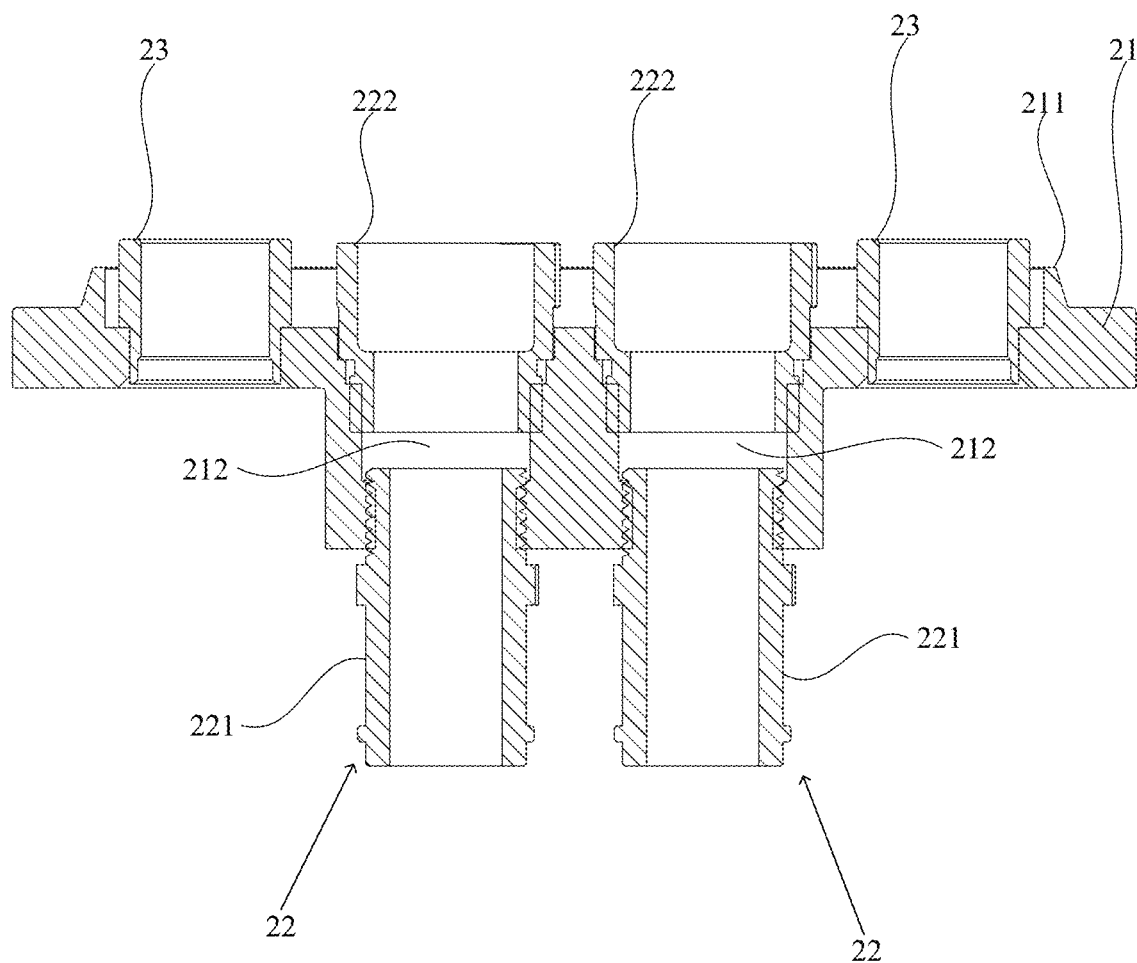
FIG. 7 is a schematic diagram of an internal structure of a matching plug-in assembly in a liquid cooling plug-in device according to an embodiment of the present invention.

As shown in FIGS. 1 to 7, the liquid cooling plug-in device of the embodiment of the present invention includes a liquid cooling plug-in assembly 1 and a matching plug-in assembly 2. The matching plug-in assembly 2 is detachably connected to the liquid cooling plug-in assembly 1. The liquid cooling plug-in assembly 1 includes a first fixed plate 11, a floating plate 12, at least one first elastic member 14 and a plurality of plug-in members 13. The plurality of plug-in members 13 are all connected to the floating plate 12, the first fixed plate 11 is provided therein with a movement cavity 111, the floating plate 12 and the first elastic member 14 are both located in the movement cavity 111, and the floating plate 12 is in floating connection with the first fixed plate 11 by means of the first elastic member 14. The floating connection of the floating plate 12 in the movement cavity 111 is realized through the first elastic member 14, which will drive the plurality of plug-in members 13 to float at the same time. The plurality of plug-in members 13 are configured to communicate with the matching plug-in assembly 2. Cooling water provided by the matching plug-in assembly 2 will take a cooling effect through the plurality of plug-in members 13 of the liquid cooling plug assembly 1; the plug-in member 13 has a large float by means of the first elastic member 14; therefore, the stability of the connection of the liquid cooling plug-in assembly 1 is enhanced, the outflow and splashing of the liquid in the plug-in member 13 are effectively avoided, no leakage is realized during the use of the liquid cooling plug-in device, and the service life of the liquid cooling plug-in device is prolonged.

A length direction of the first elastic member 14 is the same as an insertion direction of the plug-in member 13, and two ends of the first elastic member 14 abut against the first fixed plate 11 and the floating plate 12, respectively. In use, the plurality of plug-in members 13 move along an axial direction of the plug-in member 13 to realize plug-in connection between the liquid cooling plug-in assembly 1 and the matching plug-in assembly 2, that is, moving along the insertion direction of the plug-in member 13 can achieve communication between the plurality of plug-in members 13 and the matching plug-in assembly 2; the length direction of the first elastic member 14 is the same as an elastic direction of the first elastic member 14; the insertion direction of the plug-in member 13 is the same as the elastic direction of the first elastic member 14, so that the plug-in member 13 can move and adjust the position state during the plug-in movement, which realizes the insertion of the plug-in member 13 and improves the stability of the liquid cooling plug-in device.

The liquid cooling plug-in assembly 1 further includes a plurality of second elastic members 15, the plurality of second elastic members 15 are all located in the movement cavity 111, two ends of the second elastic member 15 are respectively connected to the first fixed plate 11 and the floating plate 12, and the plurality of second elastic members 15 are distributed around an outer peripheral edge of the floating plate 12. By virtue of the plurality of second elastic members, the floating connection of the floating plate 12 and adjustment of the position state are realized, and a large float is achieved, thereby effectively avoiding the outflow and splashing of a liquid in the plurality of plug-in members 13 connected to the floating plate 12 and greatly improving the stability of the liquid cooling plug-in device. Moreover, the plurality of second elastic members 15 act on the periphery of the floating plate 12, which effectively prevents the floating plate 12 from shifting, displacement and shaking during a moving process. The floating plate 12 is of a square structure, the number of second elastic members 15 is four, and the four second elastic members 15 are respectively arranged at four corners of the floating plate 12.

The insertion directions of the plurality of plug-in members 13 are all perpendicular to a length direction of the second elastic member 15. By virtue of the first elastic member 14, the floating plate 12 can move in the movement cavity 111 along a thickness direction of the floating plate 12 to conduct position adjustment; by virtue of the second elastic member 14, the floating plate 12 can moves in the movement cavity 111 along a plate plane direction of the floating plate 12 to conduct position adjustment; therefore, the plurality of plug-in members 13 can move with the displacement of the floating plate 12, which effectively avoids the outflow and splashing of a liquid in the plug-in members 13 and improves the stability of the liquid cooling plug-in device. Preferably, the second elastic member 15 is configured as a tension spring.

The matching plug-in assembly 2 includes a second fixed plate 21 and a plurality of matching members 22; the plurality of matching members 22 are all connected to the second fixed plate 21 and are in one-to-one correspondence with the plurality of plug-in members 13; the matching member 22 is detachably connected to the liquid cooling plug-in assembly 1 and in communication with the plug-in member 13. The plurality of matching members 22 are all installed on the second fixed plate 21 and detachably connected to the liquid cooling plug-in assembly 1. When the plurality of matching members 22 are connected to the liquid cooling plug-in assembly 1, the matching members 22 are in communication with the plug-in members 13; when the plurality of matching members 22 are detached from the liquid cooling plug-in assembly 1, the matching members 22 are disconnected from the plug-in members 13. The number of matching members 22 and the number of plug-in members 13 are not defined. The plurality of matching members 22 and the plurality of plug-in members 13 each include a liquid inlet pipe and a liquid outlet pipe, and circulating cooling is realized through the liquid inlet pipe and the liquid outlet pipe.

The matching member 22 may be configured as a liquid cooling socket, the plug-in member 13 may be configured as a liquid cooling plug, and the liquid cooling plug is matched with the liquid cooling socket. The liquid cooling plug is inserted into and in communication with the liquid cooling socket to realize the inflow and outflow of cooling water. Certainly, the matching member 22 may also be configured as a liquid cooling plug, the plug-in member 13 may be configured as a liquid cooling socket, and the liquid cooling plug is matched with the liquid cooling socket. The matching member 22 can pass through the floating plate 12 to come into direct plug-in communication with the plug-in member 13. Certainly, the matching member 22 is not limited to coming into direct plug-in communication with the plug-in member 13, and the matching member 22 may also be indirectly connected with the plug-in member 13 and come into communication with the plug-in member 13, and the matching member 22 is inserted into the floating plate 12 and comes into communication with the plug-in member 13 through the floating plate 12.

The floating plate 12 may be provided with a plurality of first liquid through holes 122, and the plurality of first liquid through holes 122 are in one-to-one correspondence with the plurality of plug-in members 13; the plug-in member 13 is in threaded connection to one end of the first liquid through hole 122, and the other end of the first liquid through hole 122 is configured to communicate with an external liquid supply system. One end of the first liquid through hole 122 is in threaded connection to the plug-in member 13, the matching member 22 is inserted into the other end of the first liquid through hole 122, and the matching plug-in assembly 2 is in communication with the external liquid supply system, so that the cooling water flows into the matching plug-in assembly 2 via the matching member 22, and flows to the plug-in member 13 via the first liquid through hole 122, and finally realizes a cooling operation. The plurality of plug-in members 13 each include a liquid inlet pipe and a liquid outlet pipe, and the cooling water flows in the plug-in member through the liquid inlet pipe and conducts the cooling operation, and then flows out through the liquid outlet pipe, and returns to the external liquid supply system through the matching plug-in assembly 2, thus realizing the circulating cooling. The communication between the matching member 22 and the plug-in member 13 is realized through the first liquid through hole 122 in the floating plate 12, which realizes simple assembly and convenient use.

The second fixed plate 21 includes a plurality of second liquid through holes 212, and the plurality of second liquid through holes 212 are in one-to-one correspondence with the matching members 22. The matching member 22 includes an insert 221 and a pipe joint 222. The insert 221 is in threaded connection to one end of the second liquid through hole 212, the pipe joint 222 is in threaded connection to the other end of the second liquid through hole 212, the insert 221 is inserted into the floating plate 12 or the plug-in member 13, and the plug-in member 13, the insert 221 and the pipe joint 222 are in mutual communication. During the cooling operation, the cooling water will flow by the insert 221, the second liquid through hole 212 and the pipe joint 222 in sequence to finally reach the liquid cooling plug-in assembly 1, which realizes simple assembly and convenient use.

A sealing member may be arranged in the pipe joint 222, and the sealing member can move in the pipe joint 222 to realize the unblocking or blocking of a pipeline in the pipe joint 222. In an initial state, the pipe joint 222 is not inserted into the floating plate 12 or the plug-in member 13, and the sealing member blocks the pipeline in the pipe joint 222, so that the liquid in the matching plug-in assembly 2 will not leak out; in use, the pipe joint 222 is inserted into the floating plate 12 or the plug-in member 13, and the sealing member moves in the pipe joint 222 to unblock the pipeline in the pipe joint 222, so that the matching member 22 comes into communication with the plug-in member 13 to implement the cooling operation of the liquid cooling plug-in device. Through the disassembly and assembly of the liquid cooling plug-in assembly 1 and the matching plug-in assembly 2, the matching member 22 and the plug-in member 13 can come into mutual communication and can be disconnected from each other, thus avoiding the leakage of the liquid and realizing automatic control.

In the liquid cooling plug-in assembly 1, the first fixed plate 11 may include a fixed frame 112, a front cover plate 113, and a rear cover plate 114. The front cover plate 113 and the rear cover plate 114 are respectively connected to two sides of the fixed frame 112, the movement cavity 111 is defined by the front cover plate 113, the fixed frame 112 and the rear cover plate 114, and the first elastic member 14 is pressed between the floating plate 12 and the rear cover plate 114. During a process of manufacturing the liquid cooling plug-in assembly 1, two ends of each of the plurality of second elastic members 15 are connected to the floating plate 12 and the fixed frame 112 respectively, and then the front cover plate 113 and the rear cover plate 114 are installed. During the installation of the rear cover plate 114, the first elastic member 14 is pressed between the rear cover plate 114 and the floating plate 12. The effects of simple structure and convenient manufacturing are achieved.

The floating plate 12 is provided with at least one mounting hole 121 on a side facing the front cover plate 113; the liquid cooling plug-in assembly further includes at least one positioning pin 18, one end of the positioning pin 18 is connected to the mounting hole 121, and the other end of the positioning pin 18 extends outward along the insertion direction of the plug-in member 13. The positioning pin 18 has a guiding and positioning function to realize the accurate insertion of the matching member 22 into the first liquid through hole 122 in the floating plate 12.

The mounting hole 121 may penetrate the floating plate 12, and the first elastic member 14 is inserted into the mounting hole 121 and abuts against the positioning pin 18.

The mounting hole 121 will limit the first elastic member 14, thereby effectively avoiding the offset and dislocation of the first elastic member 14 during use, improving the stability of the liquid cooling plug-in assembly 1, and realizing convenient installation. Preferably, the first elastic member 14 is configured as a belleville spring.

The matching plug-in assembly 2 may also include at least one positioning sleeve 23, which is connected to the second fixed plate 21; the positioning pins 18 are in one-to-one correspondence with the positioning sleeves 23, and the positioning pin 18 is inserted in the positioning sleeve 23. The positioning sleeve 23 and the positioning pin 18 can play a guiding and positioning role, which improves the plug-in accuracy of the liquid cooling plug-in assembly 1 and the matching plug-in assembly 2, and improving the stability of the liquid cooling plug-in device.

The movement of the floating plate 12 is based on the positioning pin 18 and the positioning sleeve 23. When the positioning pin 18 is inserted into the positioning sleeve 23 and deep into the positioning sleeve 23, the floating plate 12 will move with the displacement of the positioning pin 18. The positioning pin 18 is inserted into the positioning sleeve 23 first, and the matching member 22 is not inserted into the first liquid through hole 122. When the positioning pin 18 goes deep into the bottom of the positioning sleeve 23, the matching member 22 is accurately inserted into the first liquid through hole 122. In this way, the positioning pin 18 and the positioning sleeve 23 can play the guiding and positioning role first, which ensures the plug-in accuracy of the liquid cooling plug-in assembly 1 and the matching plug-in assembly 2.

The positioning sleeve 23 can be riveted to the second fixed plate 21, which strengthens the structural connection strength of the matching plug-in assembly 2. The number of positioning sleeves 23 and the number of positioning pins 18 can both be two, the two positioning sleeves 23 are respectively disposed at two ends of the second fixed plate 21, and a plurality of matching members 22 are located between the two positioning sleeves 23. The cross-sectional shape of the positioning sleeve 23 and the cross-sectional shape of the positioning pin 18 are not limited to circles, and they can also be squares, diamonds, special shapes, and the like as long as the positioning pin 18 can move in the positioning sleeve 23 along its length direction.

The liquid cooling plug-in assembly 1 may further include a first sealing member 16, the front cover plate 113 is provided with a first connection opening 115, the first connection opening 115 is in communication with the movement cavity 111, the floating plate 12 is located in the first connection opening 115 and the movement cavity 111, and the first sealing member 16 is connected to the front cover plate 113 and continuously and incessantly surrounds the first connection opening 115. The positioning pin 18 will extend out of a front side of the first fixed plate 11, the positioning pin 18 and the first liquid through hole 122 will both be matched with and connected to the matching plug-in assembly 2 through the first connection opening 115, and the first sealing member 16 is mounted on the front cover plate 113 to perform a sealing function, thereby effectively preventing dust and other small particles from entering the movement cavity 111 through the first connection opening 115 in the actual use of the liquid cooling plug-in assembly 1 and ensuring the reliability of the liquid cooling plug-in assembly 1.

The second fixed plate 21 is provided with a protruding ring 211 on a side facing the first fixed plate 11, the protruding ring 211 and the first sealing member 16 both continuously and incessantly surround the plurality of matching members 22, and the protruding ring 211 abuts against the first sealing member 16. During the use of the liquid cooling plug-in device, the protruding ring 211 closely abuts against the first sealing member 16 and the sealing effect is further enhanced, thereby preventing dust and other small particles from entering the movement cavity 111, and improving the reliability of the liquid cooling plug-in device.

The rear cover plate 114 is provided with a second connection opening 116, the second connection opening 116 is in communication with the movement cavity 111, the floating plate 12 passes through the second connection opening 116 and is connected to the plug-in member 13. The liquid cooling plug-in assembly 1 further includes a second sealing member 17 which continuously and incessantly surrounds the second connection opening 116, and the second sealing member 17 is connected to the rear cover plate 114 and pressed between the rear cover plate 114 and the floating plate 12. The floating plate 12 will be in threaded connection with the plurality of plug-in members 13 through the second connection opening 116, and the second sealing member is mounted on the rear cover plate to perform a sealing function, thereby effectively preventing dust and other small particles from entering the movement cavity 111 through the second connection opening 116 in the actual use of the liquid cooling plug-in assembly and ensuring the reliability of the liquid cooling plug-in assembly 1. Both the first sealing member 16 and the second sealing member 17 may be configured as sealing sleeves, and the sealing sleeves are fixed on the first fixed plate 11 by bolts.

Some embodiments of the present invention further disclose a battery pack assembly, including the above-mentioned liquid cooling plug-in device. The temperature control of the battery pack is realized by connecting the liquid cooling plug-in assembly 1 and the matching plug-in assembly 2 to improve the performance indicators of the battery pack. Moreover, a floating connection with a large float is realized, which effectively avoids the outflow and splashing of the liquid and greatly improves the stability of the battery pack assembly.

Although the specific embodiments of the present invention are described above, those skilled in the art should understand that these are only examples, and various changes or modifications can be made to these embodiments without departing from the principle and essence of the present invention. Therefore, the protection scope of the present invention is defined by the appended claims.

What is claimed is:

1. A liquid cooling plug-in assembly, comprising a first fixed plate, a floating plate, a first elastic member, and a plurality of plug-in members, wherein the plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member,
wherein the floating plate is configured to float in an insertion direction of each of the plurality of plug-in members via the first elastic member.

2. The liquid cooling plug-in assembly according to claim 1, wherein a length direction of the first elastic member is the same as the insertion direction of each of the plurality of plug-in members, and two ends of the first elastic member abut against the first fixed plate and the floating plate, respectively.

3. The liquid cooling plug-in assembly according to claim 1, wherein the first elastic member is configured as a belleville spring.

4. The liquid cooling plug-in assembly according to claim 1, further comprising a plurality of second elastic members, the plurality of second elastic members being all located in the movement cavity, two ends of each of the plurality of second elastic members being respectively connected to the first fixed plate and the floating plate, and the plurality of second elastic members being distributed around an outer peripheral edge of the floating plate.

5. The liquid cooling plug-in assembly according to claim 4, wherein the insertion directions of the plurality of plug-in members are all perpendicular to a length direction of each of the plurality of second elastic members.

6. The liquid cooling plug-in assembly according to claim 4, wherein each of the plurality of second elastic members is configured as a tension spring.

7. The liquid cooling plug-in assembly according to claim 1, wherein the first fixed plate comprises a fixed frame, a front cover plate and a rear cover plate, the front cover plate and the rear cover plate are respectively connected to two sides of the fixed frame, the movement cavity is defined by the front cover plate, the fixed frame and the rear cover plate, and the first elastic member is pressed between the floating plate and the rear cover plate.

8. The liquid cooling plug-in assembly according to claim 7, further comprising a first sealing member, wherein the front cover plate is provided with a first connection opening, the first connection opening is in communication with the movement cavity, the floating plate is located in the first connection opening and the movement cavity, the first sealing member is connected to the front cover plate, and the first sealing member continuously and incessantly surrounds the first connection opening.

9. The liquid cooling plug-in assembly according to claim 7, wherein the rear cover is provided with a second connection opening, the second connection opening is in communication with the movement cavity, the floating plate passes through the second connection opening and is connected to each of the plurality of plug-in members, the liquid cooling plug-in assembly further comprising a second sealing member, the second sealing member continuously and incessantly surrounds the second connection opening, and the second sealing member is connected to the rear cover plate and pressed between the rear cover plate and the floating plate.

10. The liquid cooling plug-in assembly according to claim 7, wherein the floating plate is provided with a mounting hole on a side facing the front cover plate, the liquid cooling plug-in assembly further comprises a positioning pin, one end of the positioning pin is connected to the mounting hole, and the other end of the positioning pin extends outward along the insertion direction of each of the plurality of plug-in members.

11. The liquid cooling plug-in assembly according to claim 10, wherein the mounting hole penetrates the floating plate, and the first elastic member is inserted into the mounting hole and abuts against the positioning pin.

12. The liquid cooling plug-in assembly according to claim 1, wherein the floating plate is provided with a plurality of first liquid through holes, the plurality of first liquid through holes are in one-to-one correspondence with the plurality of plug-in members, each of the plurality of plug-in members is in threaded connection to one end of each of the plurality of first liquid through holes, and the other end of each of the plurality of first liquid through holes is configured to communicate with an external liquid supply system.

13. A liquid cooling plug-in device, comprising a matching plug-in assembly and a liquid cooling plug-in assembly, the matching plug-in assembly being detachably connected to the liquid cooling plug-in assembly,
wherein the liquid cooling plug-in assembly comprises a first fixed plate, a floating plate, a first elastic member, and a plurality of plug-in members, the plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member,
wherein the floating plate is configured to float in an insertion direction of each of the plurality of plug-in members via the first elastic member.

14. The liquid cooling plug-in device according to claim 13, wherein the matching plug-in assembly comprises a second fixed plate and a plurality of matching members, the plurality of matching members are all connected to the second fixed plate and in one-to-one correspondence with the plurality of plug-in members, and each of the plurality of matching members is detachably connected to the liquid cooling plug-in assembly and in communication with each of the plurality of plug-in members.

15. The liquid cooling plug-in device according to claim 14, wherein the second fixed plate comprises a plurality of second liquid through holes, and the plurality of second liquid through holes are in one-to-one correspondence with the plurality of matching members, each of the plurality of matching members comprises an insert and a pipe joint, the insert is in threaded connection to one end of each of the plurality of second liquid through holes, the pipe joint is in threaded connection to the other end of each of the plurality of second liquid through holes, the insert is inserted into the floating plate or each of the plurality of plug-in members, and each of the plurality of plug-in members, the insert and the pipe joint are in mutual communication.

16. The liquid cooling plug-in device according to claim 14, wherein the liquid cooling plug-in assembly further comprises a first sealing member connected to the first fixed plate, the second fixed plate is provided with a protruding ring on a side facing the first fixed plate, the protruding ring and the first sealing member both continuously and incessantly surround the plurality of matching members, and the protruding ring abuts against the first sealing member.

17. The liquid cooling plug-in device according to claim 14, wherein the liquid cooling plug-in assembly further comprises a positioning pin, the positioning pin is connected to the floating plate and extends outward in a direction of the matching plug-in assembly, the matching plug-in assembly further comprises a positioning sleeve, the positioning sleeve is connected to the second fixed plate, and the positioning pin is inserted in the positioning sleeve.

18. The liquid cooling plug-in device according to claim 14, wherein each of the plurality of matching members is configured as a liquid cooling socket, and each of the plurality of plug-in members is configured as a liquid cooling plug; or, each of the plurality of matching members is configured as a liquid cooling plug, and each of the plurality of plug-in members is configured as a liquid cooling socket; and the liquid cooling plug is matched with the liquid cooling socket.

19. A battery pack assembly, comprising a liquid cooling plug-in device, the liquid cooling plug-in device comprising a matching plug-in assembly and a liquid cooling plug-in assembly, the matching plug-in assembly being detachably connected to the liquid cooling plug-in assembly, wherein the liquid cooling plug-in assembly comprises a first fixed plate, a floating plate, a first elastic member, and a plurality of plug-in members, the plurality of plug-in members are all connected to the floating plate, the first fixed plate is provided with a movement cavity therein, the floating plate and the first elastic member are both located in the movement cavity, and the floating plate is in floating connection with the first fixed plate by means of the first elastic member, wherein the floating plate is configured to float in an insertion direction of each of the plurality of plug-in members via the first elastic member.

\* \* \* \* \*